(12) United States Patent
Mangtani et al.

(10) Patent No.: US 6,462,520 B1
(45) Date of Patent: Oct. 8, 2002

(54) DIFFERENTIAL OUTPUT SWITCHING CONVERTER WITH RIPPLE REDUCTION

(75) Inventors: Vijay Mangtani, Sunnyvale; Leonard Harris Sherman, Los Altos, both of CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/851,666

(22) Filed: May 9, 2001

(51) Int. Cl.[7] ................................................. G05F 1/40
(52) U.S. Cl. ....................................................... 323/271
(58) Field of Search ............................. 363/71, 17, 40, 363/132, 98; 307/51, 52, 82; 323/271, 268

(56) References Cited

U.S. PATENT DOCUMENTS

| | | | | |
|---|---|---|---|---|
| 4,356,403 A | * | 10/1982 | Mohat | 307/60 |
| 5,060,130 A | * | 10/1991 | Steigerwald | 363/124 |
| 5,657,219 A | * | 8/1997 | Stanley | 363/132 |
| 6,150,803 A | * | 11/2000 | Varga | 307/60 |
| 6,292,378 B1 | * | 9/2001 | Brooks et al. | 323/272 |

* cited by examiner

Primary Examiner—Shawn Riley
(74) Attorney, Agent, or Firm—Blakely, Sokoloff, Taylor & Zafman LLP

(57) ABSTRACT

A differential switching converter system is disclosed. The converter system includes a plurality of switching converters having at least first and second converters. The plurality of switching converters is coupled in a differential configuration across an output load. Each converter has at least first and second transistors configured to apply and receive energy to and from an energy storage element. The converter system also includes a controller, which is configured to control the operation of the first and second transistors of each converter. The controller synchronizes turn-on and turn-off of the first transistor in the first converter with that of the first transistor in the second converter. The controller also controls turn-on and turn-off of the second transistors in the first and second converters to provide first and second duty cycles, respectively.

20 Claims, 4 Drawing Sheets

DIFFERENTIAL OUTPUT SWITCHING CONVERTER WITH RIPPLE REDUCTION

BACKGROUND OF THE INVENTION

1. Field of the Invention

This invention relates to switching converters, and more particularly to reducing ripple in a differential output switching converter.

2. Prior Art

A typical synchronous buck converter circuit includes a pair of metal oxide semiconductor field-effect transistors (MOSFET), an output filter, and a controller that provides the synchronous switching function. FIG. 1 illustrates the simplified schematic diagram of a synchronous buck converter 100. In the buck converter 100, the controller and gate driver 102 controls the output voltage 104. If the output voltage 104 falls below the lower limit of the regulation level, the controller/driver 102 turns on MOSFET Q1 and turns off MOSFET Q2. Thus, the controller/driver 102 transitions Q1 and Q2 into a "switch ON" state, where the full input voltage ($V_{DD}$) is applied to the LC filter of inductor L1 and capacitor C2. Substantially simultaneously, the current feeds the output load, $R_{LOAD}$. When the output voltage 104 exceeds the upper limit of the regulation level, the controller/driver 102 turns off MOSFET Q1 and turns on MOSFET Q2. This is the "switch OFF" state, where the input voltage is zero. Transistor Q2 provides an alternate path for the stored energy in inductor L1 to be delivered into the load, $R_{LOAD}$. Furthermore, the path has no sense of direction of current so that negative current is allowed.

The controller/driver 102 ensures that power MOSFETs Q1 and Q2 are not turned on simultaneously. Turning on both Q1 and Q2 simultaneously would place a momentary short across the input power bus resulting in much lower efficiencies and potential destruction of the switching devices.

FIG. 2 shows a simplified representation of switching control. The controller/driver 102 may turn on MOSFET Q1 and turn off Q2 according to a programmed duty cycle. This causes the output voltage 104 to increase, as shown, within the "switch ON" state 202. The programmed duty cycle within the controller/driver 102 may then turn off MOSFET Q1 and turn on Q2. This causes the output voltage 104 to decrease, as shown, within the "switch OFF" state 204. Therefore, the switching control keeps the output voltage 104 within the band 200 around the reference voltage.

Two synchronous buck converters may be configured to provide bi-directional voltage and/or current from a single polarity power source. To generate this bi-directional voltage, the output load may be connected between the filtered outputs of the two converters. Moreover, the voltage across the load may be adjusted by increasing the duty cycle of the first converter while decreasing the duty cycle of the second converter. However, this technique is disadvantageous when trying to get 0 volt across the load because both converters must operate with 50% duty cycle. In this case, the output voltage ripple of both converters may add to create an even larger output ripple.

BRIEF SUMMARY OF THE INVENTION

In one aspect, the present disclosure describes a differential switching converter system. The converter system includes a plurality of switching converters having at least first and second converters. The plurality of switching converters is coupled in a differential configuration across an output load. Each converter has at least first and second transistors configured to apply and receive energy to/from an energy storage element. In one embodiment, the energy storage element includes an inductor. Each converter is configured to regulate energy transfer from input to output while maintaining a constant output level within load limits.

The converter system also includes a controller, which is configured to control the operation of the first and second transistors of each converter. The controller synchronizes turn-on and turn-off of the first transistor in the first converter with that of the first transistor in the second converter. The controller also controls turn-on and turn-off of the second transistors in the first and second converters to provide first and second duty cycles, respectively. Therefore, the controller operates to substantially reduce ripple in the constant output level.

In another aspect, the present disclosure describes a method for substantially reducing ripple on a load. The method includes turning on high side transistors of switching converters, substantially simultaneously. The high side transistors are then turned off, and the low side transistors are turned on, in response to a programmed duty cycle for each of the switching converters.

DETAILED DESCRIPTION OF THE PREFERRED EMBODIMENT

In recognition of the above-described difficulties with prior systems, the present disclosure describes a system and technique for providing bi-directional voltage and/or current from a single polarity power source while minimizing the ripple across the load. The system includes a DC-DC differential output switching converter appropriately configured to substantially eliminate ripple at 0 volt. Moreover, the differential output switching converter substantially reduces ripple across the load at other voltages or currents. Further, the switching converter described below may provide control of the output signal based on methods including hysteretic control, pulse width modulation (PWM), Quick-PWM, pulse frequency modulation (PFM), and other related control methods.

The advantages of the present system and technique include the increase in efficiency of the regulator provided by the reduction of ripple in current passing through the load. This may provide a significant advantage in applications powering differential loads that are sensitive to ripple, such as thermoelectric coolers used in laser diode circuits.

Figure 3:
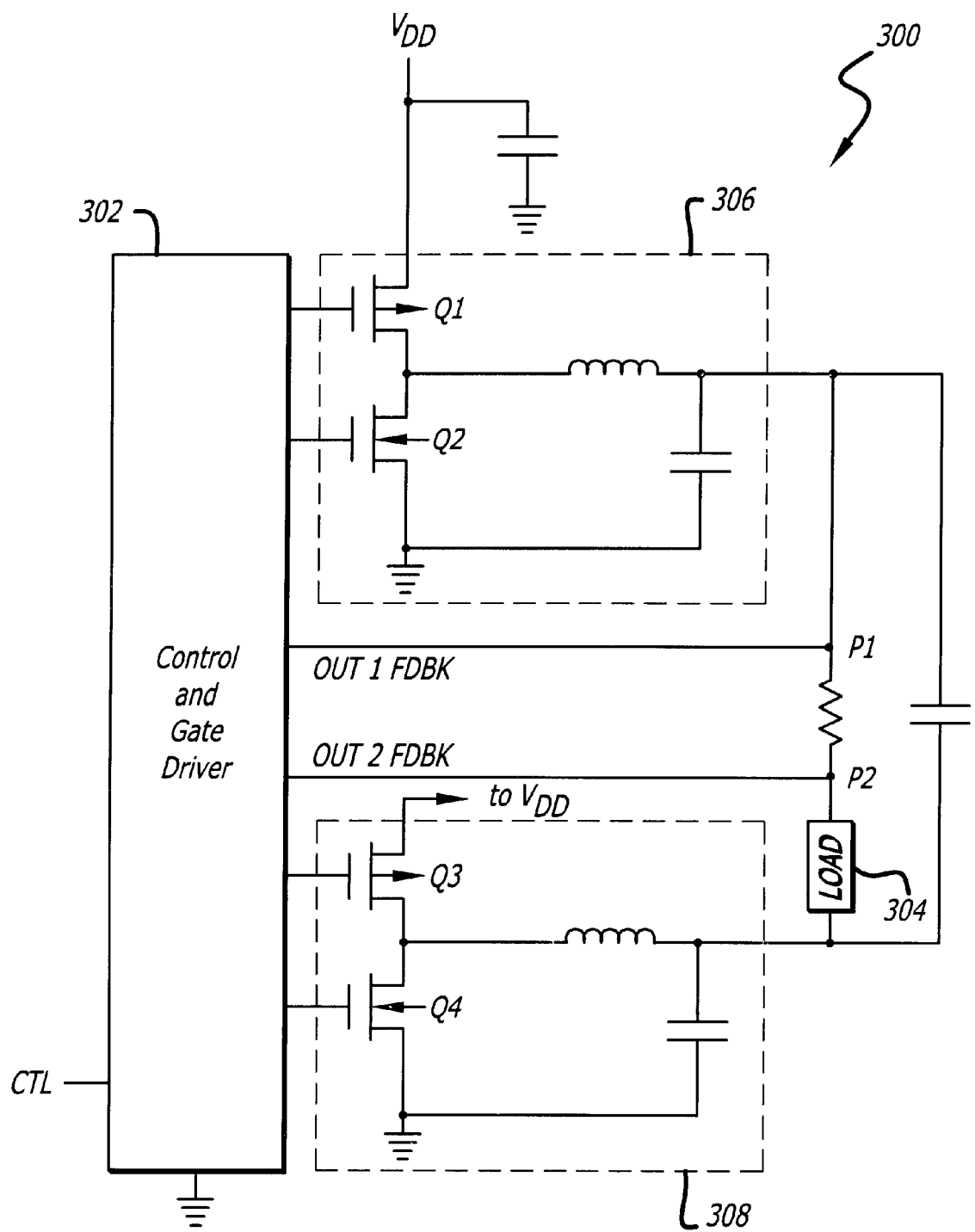
FIG. 3 is a simplified schematic diagram of a differential output switching converter according an embodiment of the present system.

A DC-DC differential output switching converter 300 in accordance with an embodiment of the present system is illustrated in FIG. 3. The switching converter 300 includes two synchronous buck converters 306, 308 connected in a differential configuration that may drive a differential load 304. In one implementation of the illustrated embodiment, both converters 306, 308 may be integrated onto a single substrate in an integrated circuit (IC). Further, the load 304 may be a thermoelectric cooler used in laser diode circuits.

Figure 1:
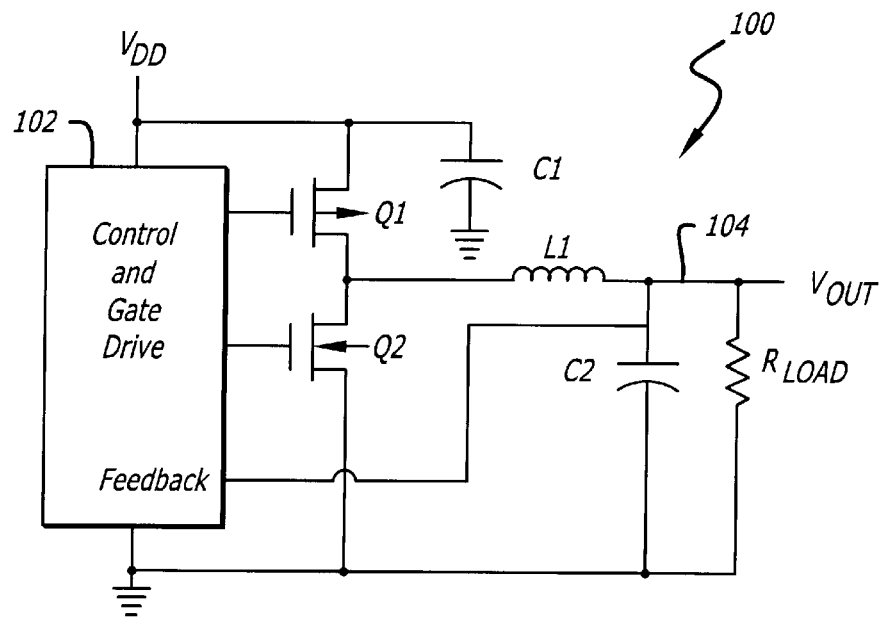
FIG. 1 is a schematic diagram of a conventional synchronous buck converter.
Figure 2:
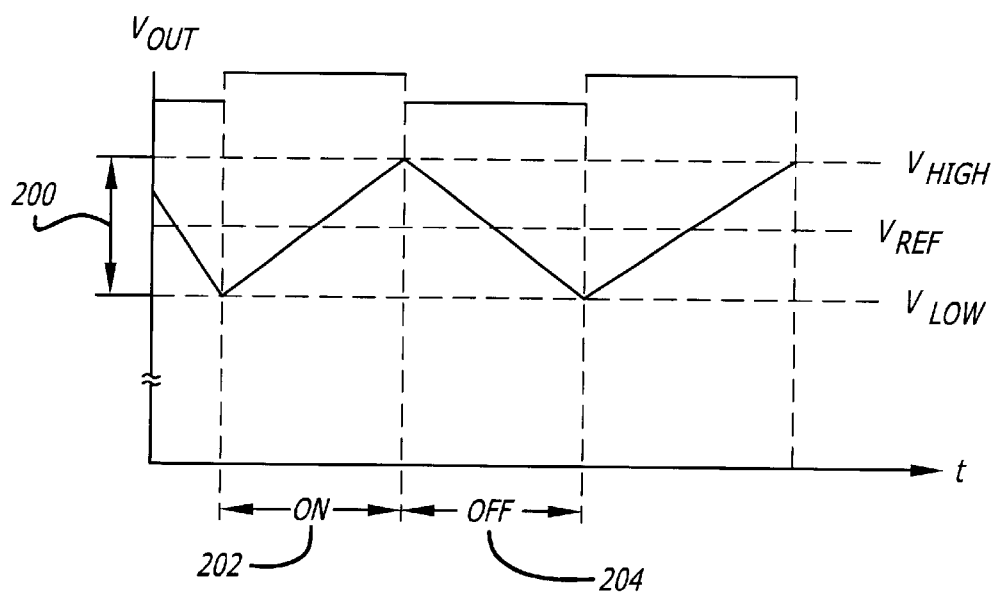
FIG. 2 shows a simplified representation of switching control.

The switching converter 300 also includes a controller and gate driver 302. The controller/driver 302 appropriately controls the operation of MOSFET transistors Q1 through Q4 to minimize the ripple across the differential load 304. The controller/driver 302 also controls switch ON and switch OFF states of each converter 306, 308 to appropriately adjust the duty cycle of the converter. For example, the controller/driver 302 may control ON and OFF times of transistors Q1 and Q2 to adjust the duty cycle of the converter 306. Operation of the transistors Q1 and Q2 may be performed according to the procedures described above in connection with the description of FIG. 1. Further, the controller/driver 302 may control ON and OFF times of transistors Q3 and Q4 to adjust the duty cycle of the converter 308.

When the duty cycles of the converters 306 and 308 are equal (i.e. at 50% duty cycle), the average output voltage/current of each converter 306, 308 is approximately equal to that of the other converter. Thus in the case of a differential voltage output, the average output would be approximately 0 volt. Increasing the duty cycle of the converter 306 and simultaneously decreasing the duty cycle of the converter 308 changes the voltage/current across the load 304.

Figure 4:
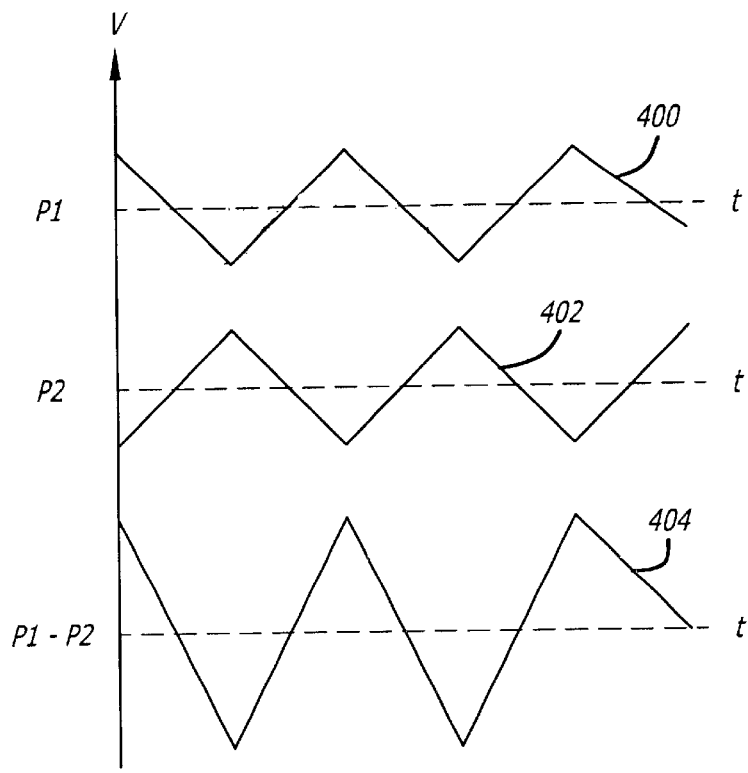
FIG. 4 shows an example plot having curves of output signal of each converter and a difference curve.

As an example, FIG. 4 shows a plot having output curves 400, 402 for converters 306, 308, respectively. The plot also shows a differential output curve 404. In this example, both converters 306, 308 are operated at 50% duty cycle to provide approximately 0 volt for an average differential output. However, the plot illustrates the presence of a residual ripple on the differential output load 304.

The controller/driver 302 may be configured to provide control signals to transistors Q1 through Q4 to substantially reduce or eliminate any residual ripple appearing on the differential output load 304. By operating both converters 306, 308 in an in-phase mode, the ripple across the load 304 may be substantially reduced.

The process used to substantially reduce the ripple on the differential output load may be described as follows.

In one case, high side transistors of both converters are turned on substantially simultaneously. In the illustrated embodiment of FIG. 3, the high side transistors are Q1 and Q3. When the high side transistors are turned on, the full input voltage is applied to the energy storage elements, such as inductors. Because the input voltage (i.e. supply voltage) is DC, current through the inductor rises linearly with time at a rate that is proportional to the difference between the supply voltage and the output voltage divided by the inductance. The energy stored in the inductor for the duration of the switch ON state 202 is equal to one-half the inductance times the square of the peak current.

After an appropriate amount of time adjusted to a particular duty cycle for each converter, the high side transistors are turned off and the low side transistors are turned on. The turn-on and turn-off times of the transistors may be appropriately adjusted to meet the duty cycle requirement for each converter. For example, if the duty cycle requirement for the converter 306 is 65% while that of the converter 308 is 35%, the turn off of the high side transistor and the turn on of the low side transistor in converter 308 occurs first at 35% duty cycle mark. Then at 65% duty cycle mark, the turn off of the high side transistor and the turn on of the low side transistor in the converter 306 occurs. In the illustrated embodiment of FIG. 3, the low side transistors are Q2 and Q4.

In an alternative case to the case described above, low side transistors of both converters are turned on substantially simultaneously. After an appropriate amount of time adjusted to a particular duty cycle for each converter, the low side transistors are turned off and the high side transistors are turned on.

The above-described process may be programmed as computer software residing in the controller and gate driver 302 of FIG. 3. The process may also be hard coded in a read-only memory (ROM) or in a logic array.

Figure 5:
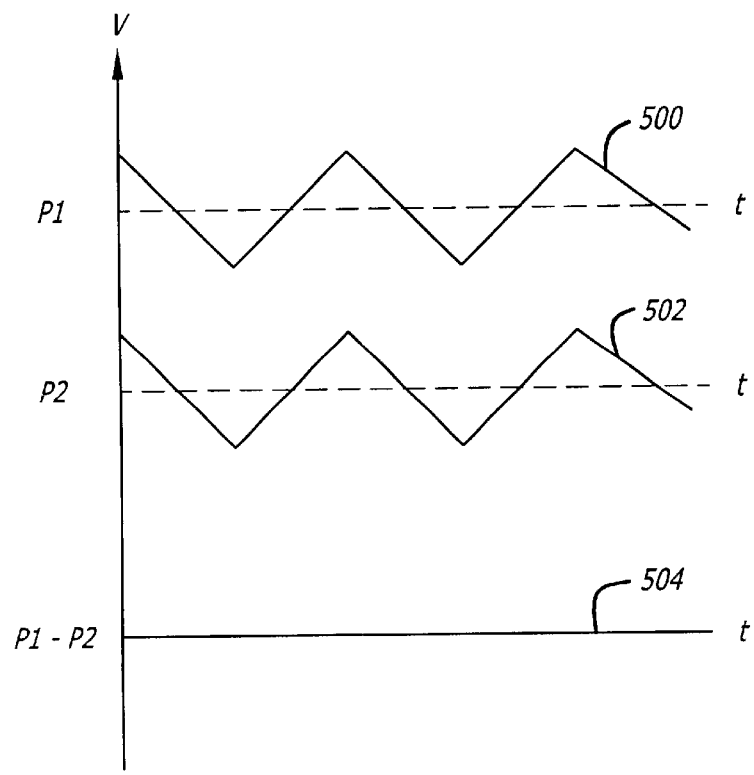
FIG. 5 shows an example plot of an in-phase mode configuration with 50% duty cycle for each converter.

FIG. 5 shows a plot having output curves 500, 502 for converters 306, 308, respectively, and a differential output curve 504, where the system is operating in an in-phase mode according to the process described above. By operating the transistors Q1 and Q3 in phase, and controlling the transistors Q2 and Q4 to provide appropriate duty cycles, the differential output curve 504 shows substantial elimination of ripple across the output load 304. Although the example of FIG. 5 is at 50% duty cycle for each converter 306, 308, substantial reduction in ripple can be achieved at different duty cycles as well.

Figure 6:
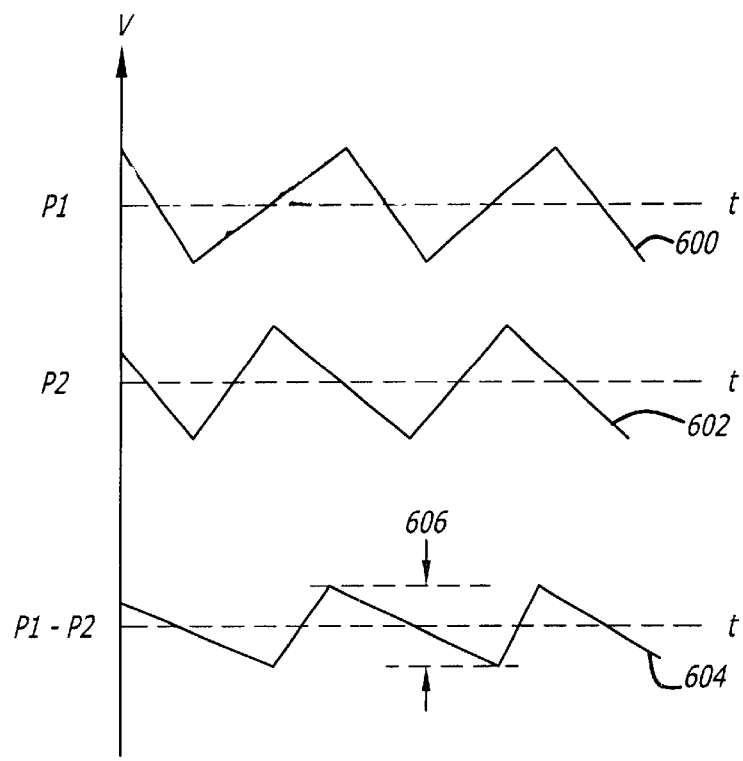
FIG. 6 shows an example plot of an in-phase mode configuration with 65% and 35% duty cycles for the upper and lower converters, respectively.

For example, FIG. 6 shows a plot having output curves 600, 602 for converters 306, 308, respectively, and a differential output curve 604. The system is also operating in an in-phase mode according to the process described above. In the illustrated embodiment, the converter 306 (output P1) is operated at 65% duty cycle, while the converter 308 (output P2) is operated at 35% duty cycle. With the operation of the system in the in-phase mode, the differential output curve 604 shows substantial reduction in the ripple 606. However, it can be seen that when the converters 306, 308 of the system are operated at duty cycles different from 50%, the differential output ripple 606 may not be zero. Therefore, at other duty cycles (i.e. other than 50% for both converters 306, 308), a phase synchronization operation may be adjusted to provide further ripple reduction. For example, when the converter 306 is operated at 65% duty cycle and the converter 308 is operated at 35% duty cycle, as illustrated in FIG. 6, the phase offset of the converter output signals may be adjusted to an offset slightly away from zero value to compensate for the duty cycle difference.

Figure 7:
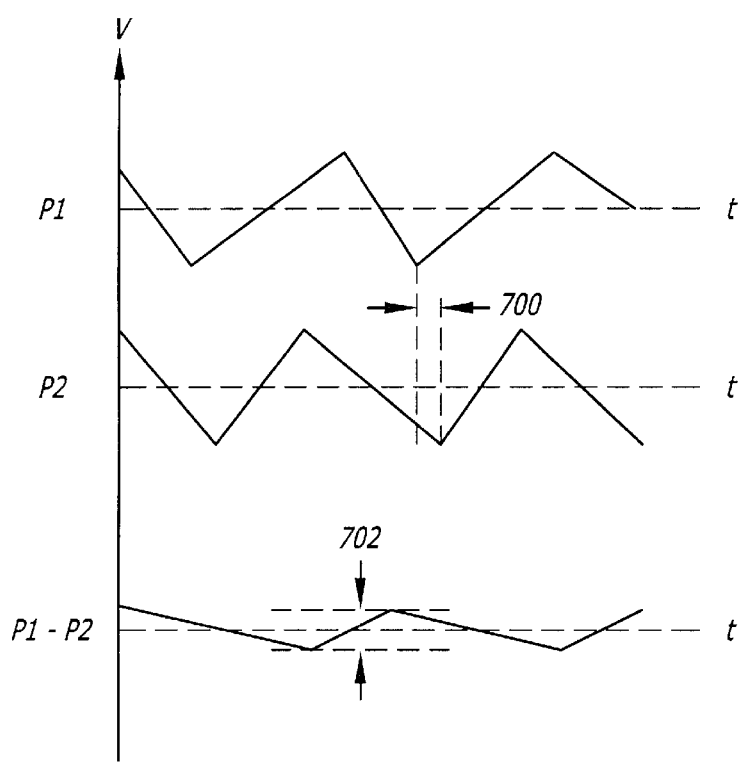
FIG. 7 shows an example plot of a small out-of-phase mode configuration with 65% and 35% duty cycles for the upper and lower converters, respectively.

For the case of FIG. 6, the phase synchronization operation may be adjusted as shown in FIG. 7, which illustrates one example of how a slight shifting 700 of the phase synchronization between the outputs of the converters 306, 308 provides a further reduction in the ripple 702. Thus in FIG. 7, the shifting 700 of the phase provides a ripple 702 that is smaller than the ripple 606 in the in-phase mode of FIG. 6.

While specific embodiments of the invention have been illustrated and described, other embodiments and variations are possible. For example, the transistors Q1 through Q4 illustrated in FIG. 3 may be substituted with any controllable switching devices.

All these are intended to be encompassed by the following claims.

What is claimed is:

1. A switching converter system, comprising:
   a plurality of switching converters having at least first and second converters, said plurality of switching converters coupled in a differential configuration across a load, each converter having at least first and second transistors configured to apply and receive energy to and from an energy storage element, where said each converter is configured to regulate energy transfer from input to output while maintaining a constant output level within load limits; and a controller to control said at least first and second transistors of said each converter, said controller operating to synchronize turn-on and turn-off of said first transistor in said first converter with that of said first transistor in said second converter, said controller also operating to appropriately control turn-on and turn-off of said second transistors in said first and second converters to provide first and second duty cycles, respectively, said controller operating to substantially reduce ripple in said constant output level.

2. The system of claim 1, further comprising:

a first feedback element operating to feed first output signal level of said first converter to said controller; and a second feedback element operating to feed second output signal level of said second converter to said controller.

3. The system of claim 1, wherein said energy storage element is an inductor.

4. The system of claim 1, wherein said load is connected between outputs of said first converter and said second converter.

5. The system of claim 1, wherein said load is a thermo-electric cooler.

6. The system of claim 1, wherein said at least first and second switching converters are integrated into a common substrate.

7. The system of claim 1, wherein said first transistor of said each converter is a high side transistor operating to apply energy to said energy storage element.

8. The system of claim 1, wherein said second transistor of said each converter is a low side transistor operating to receive energy from said energy storage element.

9. The system of claim 1, wherein said first transistor of said each converter is a low side transistor operating to apply energy to said energy storage element.

10. The system of claim 1, wherein said second transistor of said each converter is a high side transistor operating to receive energy from said energy storage element.

11. The system of claim 1, wherein said first and second transistors both converters are metal oxide semiconductor field-effect transistors (MOSFET).

12. A differential switching regulator providing an output to a differential load, comprising:

a first switching converter including first and second controllable switching devices connected in series, and a first energy storage element, said first controllable switching device configured to apply energy to said first energy storage element, said second controllable switching device configured to provide a path for delivering energy from said first energy storage element;

a second switching converter including third and fourth controllable switching devices connected in series, and a second energy storage element, said third controllable switching device configured to apply energy to said second energy storage element, said fourth controllable switching device configured to provide a path for delivering energy from said second energy storage element; and a gate driver configured to synchronize turn-on and turn-off of said first and third controllable switching devices, and control turn-on and turn-off of said second and fourth controllable switching devices to maintain appropriate duty cycle for said first and second switching converter, such that said gate driver substantially reduces ripple in the output.

13. The regulator of claim 12, wherein ratios of said turn-on and turn-off of said first and third controllable switching devices to turn-on and turn-off of said second and fourth controllable switching devices are pre-programmed in the gate driver as duty cycles for said first and second switching converters, respectively.

14. The regulator of claim 12, wherein said controllable switching devices are transistors.

15. A method for substantially reducing ripple on a load, comprising:

turning on high side transistors of first and second switching converters, substantially simultaneously; and turning off said high side transistors of said first and second switching converters, and turning on said low side transistors of said first and second switching converters, in response to a programmed duty cycle for each of said first and second switching converters.

16. The method of claim 15, further comprising:

receiving said feedback signals from outputs of said first and second switching converters.

17. The method of claim 15, wherein a ratio of said turning on and turning off of said high side transistors and said low side transistors provide a duty cycle for each switching converter.

18. The method of claim 17, wherein said turning on and turning off of said high side transistors and said low side transistors are equal in duration, such that said duty cycle is 50% for each switching converter.

19. The method of claim 17, wherein the duty cycle is higher than 50% for the first switching converter while the duty cycle is lower than 50% for the second switching converter.

20. The method of claim 19, wherein said turning on and turning off of said high side transistors and said low side transistors are appropriately adjusted away from complete synchronization to compensate for different duty cycles of the first and second switching converters.

* * * * *